June 5, 1928. 1,672,491
F. HORAK
COMBINED RECTANGULAR GAUGE AND CALIPERS
Filed Aug. 19, 1921
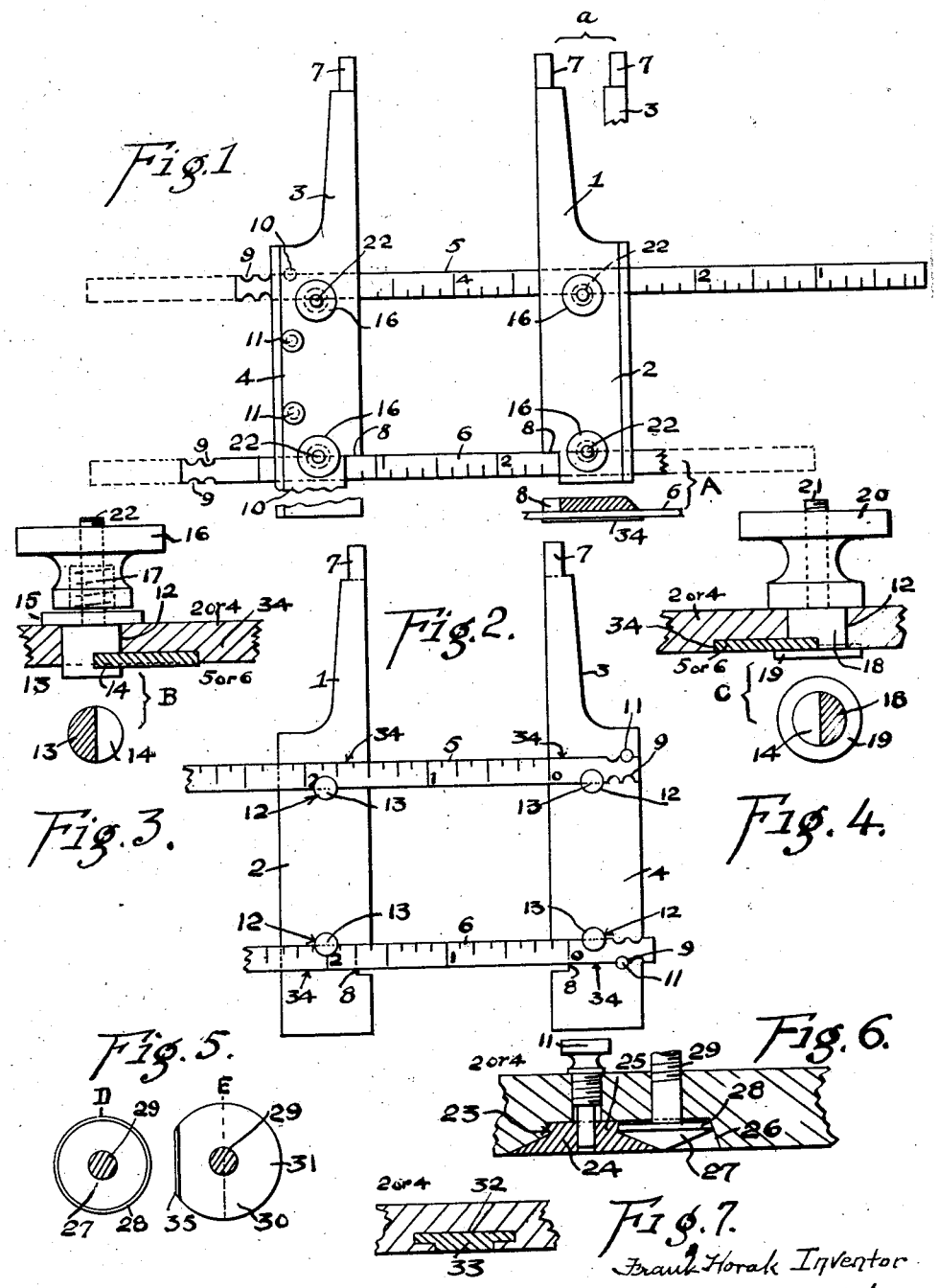

Patented June 5, 1928.

1,672,491

UNITED STATES PATENT OFFICE.

FRANK HORAK, OF VALPARAISO, INDIANA, ASSIGNOR OF ONE-HALF TO MAX HIRSCH, OF VALPARAISO, INDIANA.

COMBINED RECTANGULAR GAUGE AND CALIPERS.

Application filed August 19, 1921. Serial No. 493,745.

My invention relates to improvements in combined rectangular gauge and calipers and it more especially consists of the features hereinafter pointed out in the annexed claims.

The purpose of my invention is to provide a single gauge that may be used instead of numerous separate gauges which have been used heretofore; that is adapted to universal adjustments in terms of rectangular dimensions; that may be made with all under surfaces flush with each other; that may combine any desired style of scale graduations; that can be used equally well by machinists or draftsmen; that becomes a depth gauge capable of measuring more than one dimension at the same time; that is both an inside and an outside caliper; that permits one scale and a finger body to be used independently of the other thus providing two distinctly separate measuring devices; that combines such separate devices into a single unit for caliper measurements; and that may be used as a transfer gauge which will carry more than one dimension at the same time.

With these and other ends in view, I illustrate in the accompanying drawing such instances of adaptation as will disclose the broad underlying features without limiting myself to the specific details shown thereon and which are described herein.

Figure 1 is a top plan view of a gauge; also showing an edge view of a finger tip at a and a sectional end view of a finger body at A.

Figure 2 is a bottom plan view of a gauge.

Fig. 3 is an enlarged elevation partly in section of a slip-in-clamping screw, with a scale in position and at B a plan in section of the screw.

Fig. 4 is a similar view to Fig. 3 showing a retained clamping screw with a plan view of it at C.

Fig. 5 shows two plan views of flush clamping screws, at D a circular one with beveled surfaces and at E one with beveled chords.

Fig. 6 is an enlarged sectional view of a beveled scale and companion conical clamping screw in a finger body showing an under surface without any projecting parts.

Fig. 7 is a sectional detail of a T shaped slot and scale.

The gauge exemplified in the drawing is susceptible of so many divers uses that it is impracticable to describe them herein; suffice it to say, some of them have already been referred to in the preamble and a multitude of unnoted ones will readily suggest themselves to persons who use the device.

The device is extremely simple, comprising only four main parts, with four clamping screws, four thumb screws and two limiting pins. There are two gauge bodies 2 and 4 each of which has a projecting finger, a finger 1 on body 2 and a similar finger 3 on body 4. Both of the fingers have finger tips 7 that in actual size are a standard sub-multiple of an inch in width, usually ⅛ inch each. These tips are also thinned somewhat as shown at a of Fig. 1. In this figure the body 2 ends just a little beyond the limits of the rear scale 6 but the companion member 4 is broken off, suggesting an extension of a desired length.

In Fig. 2 both members 2 and 4 are shown projecting beyond the edges of scale 6, a greater distance than member 2 does in Fig. 1. These dimensions can be changed as desired without departing from the spirit of my invention.

Measuring scales 5 and 6 slide in transverse grooves 34 formed on the under side of the members 2 and 4 in any desired relation with respect to each other or to the finger bodies 2 and 4. These or any other type of scales may be graduated in any desired manner, reading from end to end in one direction, in reverse order, or otherwise. When the gauge is to be used as a caliper, the scales may be made direct reading whether it be used for inside or outside calipering. This is shown in Figs. 1 and 2 wherein two notches 9 are formed in one or both edges of each of the scales 5 and 6. The relation of these for calipering purposes is especially shown in Fig. 2.

When the tip ends 7 are used for inside measurements, a scale may be set like 6 with the limit pin 11 in the hole 10 of member 4 and in the inner groove 9 of the scale, then the distance that the outer edges of the finger tips 7 are apart can be read directly without making any allowances whatever at the edge of the notch 8 formed in the edge of the member 2 facing the companion inner edge of member 4. When the tip ends 7 are used for outside measurements, one or both scales may be set like scale 5 of Fig. 2 with the limit pin 11 in the outer notch 9, then the dimension can be read off directly from the inner edge of member 2.

Whenever the gauge is used for field or other drafting purposes, both of the scales may be set similar to 5 in Fig. 2 but with the scale inverted; or if the beveled edge scale 24 is used, holes 10 are formed in the center of the scale width for limit pins 11', which in this special case may be threaded as indicated in Fig. 6.

Scales 5 and 6 or 24 may be graduated as 5 is shown in Fig. 1 wherein the end projecting from the right hand side is used as a depth gauge. The scale 24 may have one edge graduated like 5 and 6 in Fig. 2, and the other edge like 5 in Fig. 1; in the former case the limit holes in the scale corresponding to the notches 9 would bear the same relation to notches 8 as is the case with scales 5 and 6. The limit pins 11 may be "stored" on the member 4 as shown in Fig. 1 and if desired they may be threaded as shown in Fig. 6 so as to not become easily lost and also to form a precision limit stop. The dimensions of these and other parts of Fig. 6 are only suggestive and they do not bear any scale relation to each other.

The finger extensions or members 2 and 4, Fig. 2, have holes 12 for either of the clamping screws 13 or 18. The former is shown in Fig. 3 and the latter in Fig. 4. The screw 13 is a slip-in screw so designated because it can be removed as soon as the scale is withdrawn. It has a threaded stem 22 on which the thumb nut 16 turns. On the under side of this nut a recess is formed in which a spring 17 is placed so as to abut the washer 15. The clamping screw 18 has an enlarged head 19 which prevents the screw becoming detached unless the thumb nut 20 is removed from the threaded stem 21. Both of the lower ends of screws 13 and 18 have scale slots 14 formed therein as is shown on the attached plan views, Fig. 3 B and Fig. 4 C.

The scales 5 and 6 and their clamping screws 13 and 18 have the disadvantage in that they project away from the under face of the gauge, nullifying close readings on account of parallax. Scale 33 in T slot 32 admits of flush under surfaces but does not eliminate parallax. The complete disappearance of parallax is secured by means of a double edged beveled scale 24 shown in Fig. 6 with which great accuracy can be attained. For many purposes where such accuracy is not required the presence of parallax in scales 5, 6, or 33 does not constitute a practical objection.

Beveled-edge scales 24 slide in under cut or dovetail grooves 23 and they are retained by means of the dovetail top face 25 and they are held in any desired lengthwise adjustment by means of clamping screw 29. This has an enlarged head 27 or 31. At 27 it is shown conical on the under side to approximately fit the bevel edge of the scale 24 and it has a narrow reverse beveled rim 28 that engages the under cut 25 of the scale and the tapering hole 26. At D Fig. 5 this screw is shown in plan, and alongside at E the screw 29 is shown with a non-conical head that has a large beveled chord 30 indicated by a vertical dotted line and a narrow chord 35.

One of the advantages of the conical head 27 is that the scale 24 can be inserted in the slot without any reference whatever to the rotary position of the screw; while in the case of screws 13, 18, and the head 31, they must be exactly aligned before a scale can be entered into a slot. The screw 29 may be tightened by means of any suitable nut such as 16 or 20; and if the nut is to be prevented from coming entirely off the screw, the threaded stem may have its outer end upset as is shown in Fig. 4.

I do not limit myself to the exact exemplifications shown and described, as wide changes can be made in the accessory parts which will still fall within the scope of permissible equivalents and micrometric adjustments of the scales may be provided as desired to the extent that certain adaptations are necessary to meet special exigencies.

What I claim is:

1. In combined measuring scales, a unit member having a projection therefrom whose opposite edges are for internal and external measurements, respectively, a slidable scale in such member adapted to indicate inside dimensions, a second slidable scale in said member adapted to indicate outside dimensions, a second unit member slidable on said scales provided with a projection therefrom whose opposite edges are for internal and external measurements respectively adapted to cooperate with the projection of the first unit member, and means for clamping the scales to said members in adjustable relation thereto.

2. In combined measuring scales, a pair of unit members each one having a projection therefrom whose opposite edges are adapted for internal or external measurements, respectively, a pair of separate scales slidable across both members the position of one of said scales in such members being a direct-reading indication of an internal measurement and the position of the other scale in the unit members being a direct-reading indication of an external dimension, and means for securing the scales and members to each other as desired.

3. In measuring scales, a pair of relatively flat unit members each one having an extension whose opposite edges are adapted for internal or external measurements, respectively, a pair of separate scales slidable across such members with the under faces of the scales and said members being approximately flush with each other one of such scales serving to indicate the internal dimensions and the other one serving to indicate the external dimensions determined respectively by the opposite edges of the unit member projections, and means on the members flush with the under side of the scales and members for clamping the parts to each other.

In testimony whereof I affix my signature.

FRANK HORAK.